(12) United States Patent
Sarnoff

(10) Patent No.: US 6,711,989 B1
(45) Date of Patent: Mar. 30, 2004

(54) INTERCHANGEABLE DISPOSABLE FOIL PAN/COVER

(75) Inventor: Norton Sarnoff, Northbrook, IL (US)

(73) Assignee: Handi-Foil Corporation, Wheeling, IL (US)

( * ) Notice: Subject to any disclaimer, the term of this patent is extended or adjusted under 35 U.S.C. 154(b) by 0 days.

(21) Appl. No.: 10/280,999

(22) Filed: Oct. 24, 2002

(51) Int. Cl.[7] .......................... A47J 27/00; A47J 37/00; A47J 37/10; B65D 90/00; A23L 1/00

(52) U.S. Cl. .......................... 99/340; 99/400; 99/426; 99/446; 99/449; 220/573.1; 220/669; 220/912; D7/354; D7/359

(58) Field of Search ............... 99/339, 340, 400, 99/401, 422–426, 444–450; 220/669–671, 604, 608, 574, 675, 912, 4.21, 4.24, 4.25, 573.1, 771, 787; D7/354, 359; D9/424, 428, 426; 229/406, 5.82, 3.5 MF; 126/369, 275 R; 206/518; 426/106

(56) References Cited

U.S. PATENT DOCUMENTS

| | | | | |
|---|---|---|---|---|
| 642,507 A | * | 1/1900 | Topping | 99/347 |
| 2,673,003 A | * | 3/1954 | Stewart | 220/671 |
| 2,722,173 A | * | 11/1955 | Cunningham | 249/168 |
| 3,326,408 A | * | 6/1967 | Ringlen | 220/787 |
| 3,659,585 A | * | 5/1972 | Bay | 126/390.1 |
| 3,958,504 A | * | 5/1976 | Levin | 99/426 |
| 4,216,763 A | * | 8/1980 | Miklas | 126/275 R |
| 4,883,195 A | * | 11/1989 | Ott et al. | 220/839 |
| 4,974,738 A | * | 12/1990 | Kidd et al. | 220/4.24 |
| 5,628,427 A | * | 5/1997 | Hayes | 220/669 |
| 5,666,875 A | * | 9/1997 | Wener | 99/422 |
| 5,878,656 A | * | 3/1999 | Fletcher et al. | 99/340 |
| 6,293,458 B1 | * | 9/2001 | Sarnoff | 229/5.82 |

* cited by examiner

Primary Examiner—Timothy F. Simone
(74) Attorney, Agent, or Firm—Adam K Sacharoff; Much Shelist

(57) ABSTRACT

This invention relates to an interchangeable disposable pan/cover having a continuous wall and a rim surrounding the pan/cover. The wall is preferably inclined and the rim is divided into two substantially equal first rim and second rim sections. The first rim section has a rolled-over bead formed at the outer end thereof. The end of the second rim section has a bead accommodating indent. The bead accommodating indent is sized so that when the bead of the first rim section rests in the bead accommodation indent, the lower surface of the first rim section abuts the upper surface of the second rim section. To have a pair of the interchangeable disposable pan/covers easily joined, each pan/cover has an orientation and closing flange extending upwardly from the outer end of the second rim section and extending substantially perpendicular to the base wall.

6 Claims, 2 Drawing Sheets

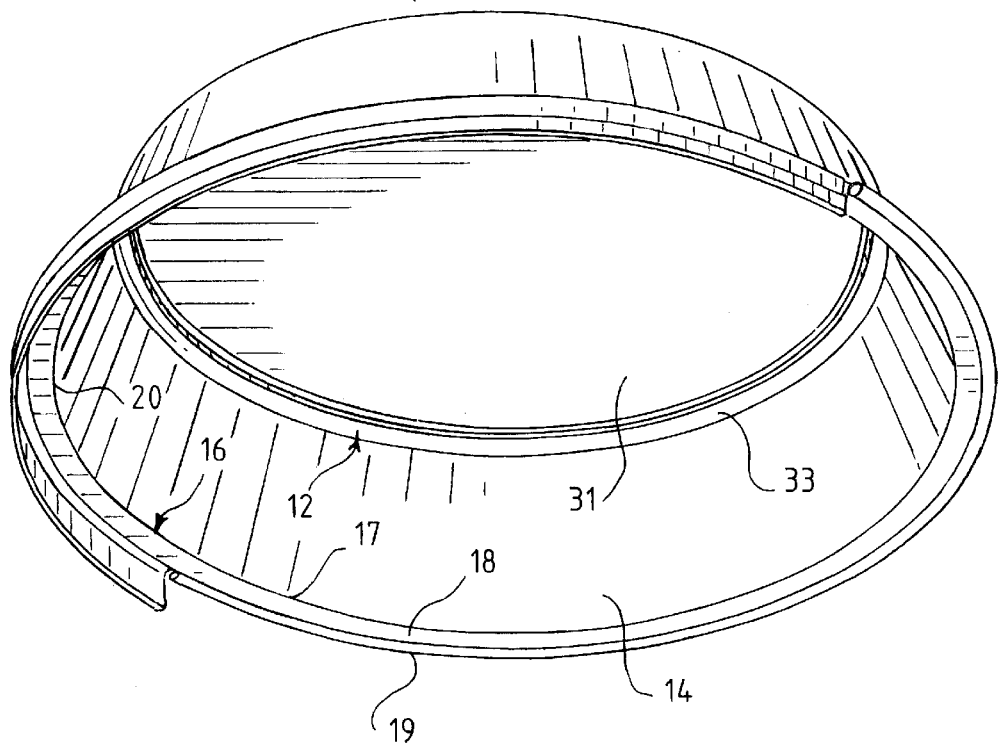
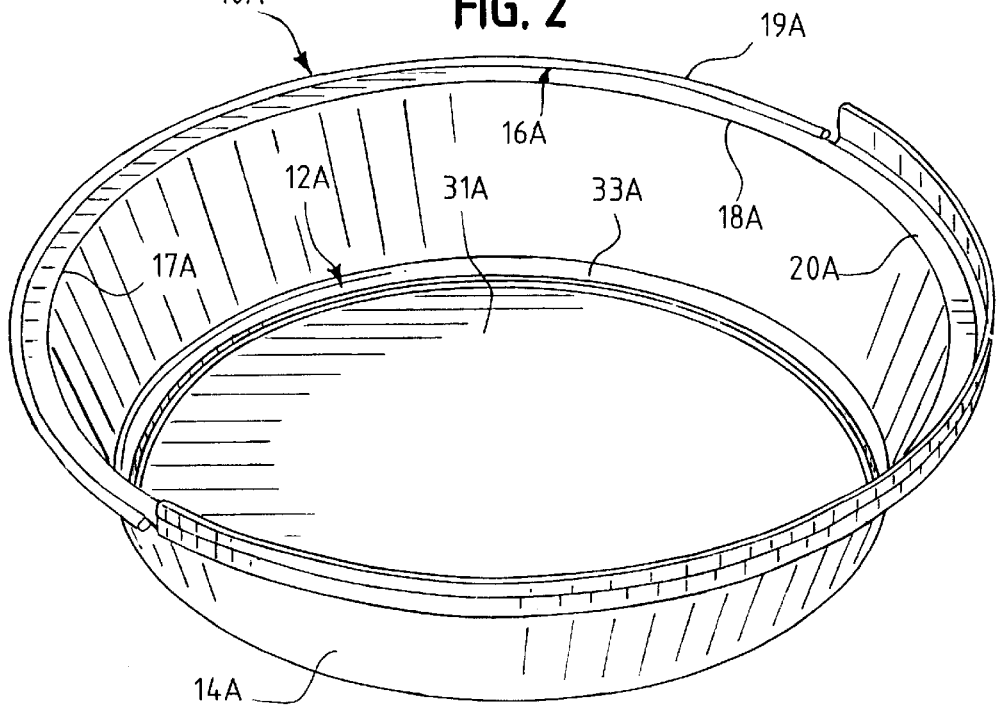

INTERCHANGEABLE DISPOSABLE FOIL PAN/COVER

The present invention relates to a disposable foil pan/cover which can be used for holding and cooking various items. More particularly the present invention relates to a one-piece interchangeable disposable aluminum foil pan/cover having an inclined side and an orientation and closing mechanism for a pair of joined interchangeable disposable pan/covers.

BACKGROUND OF THE INVENTION

Aluminum foil pan/covers are used for cooking, baking and roasting since they are efficient in quickly distributing heat and are also relatively inexpensive thus, making them disposable. A wide variety of shapes and sizes of aluminum foil pan/covers have been built and developed. Generally the pan/covers for carry outs and reheating are round in shape and those for roasting are rectangle or oval. Also various types of formations, such as ribs, are typically provided in the side wall and the base panel or wall usually has platforms and/or recesses.

Therefore it would be desirable to have a interchangeable disposable pan/cover which has an easy orientation and closing mechanism.

SUMMARY OF THE INVENTION

In accordance with the present invention I provide an interchangeable disposable foil pan/cover having a side wall and a rim surrounding the pan/cover opening. The rim extends laterally away from the pan/cover opening and the side wall and is substantially parallel to the base wall. Extending upwardly from the end of the rim and substantially perpendicular to the base wall is an orientation and closing flange. The orientation and closing flange extends for approximately 50% of the perimeter the of the rim so that the pan portion of the pan/cover is identical to and interchangeable with the cover portion of the pan/cover. The side wall may have ribs or flutes U.S. Pat. No. 6,293,458. The base panel may have any suitable configuration such as shown in the U.S. Pat. Nos. 5,878,656 and 6,293,458.

Another feature of the present invention is to provide the above one-piece interchangeable disposable aluminum foil pan/cover i.e. roasting pan/cover having inclined side wall inclined at 60° to 90° and a laterally extending rim surrounding the pan/cover with a rolled-over bead at the end of one portion of the rim and an upwardly extending orientation flange at the end of another portion of the rim, and the end of the orientation flange being turned to provide a smooth rounded end for the orientation flange.

Further objects, features, and advantages of the present invention will become more apparent from the following description and drawings.

BRIEF DESCRIPTION OF THE DRAWINGS

FIG. 1 is a perspective view of the cover portion of a disposable foil pan/cover according to my invention.

FIG. 2 is a perspective view of the pan portion of a disposable foil pan/cover according to my invention.

DETAILED DESCRIPTION OF THE INVENTION

Figure 3:
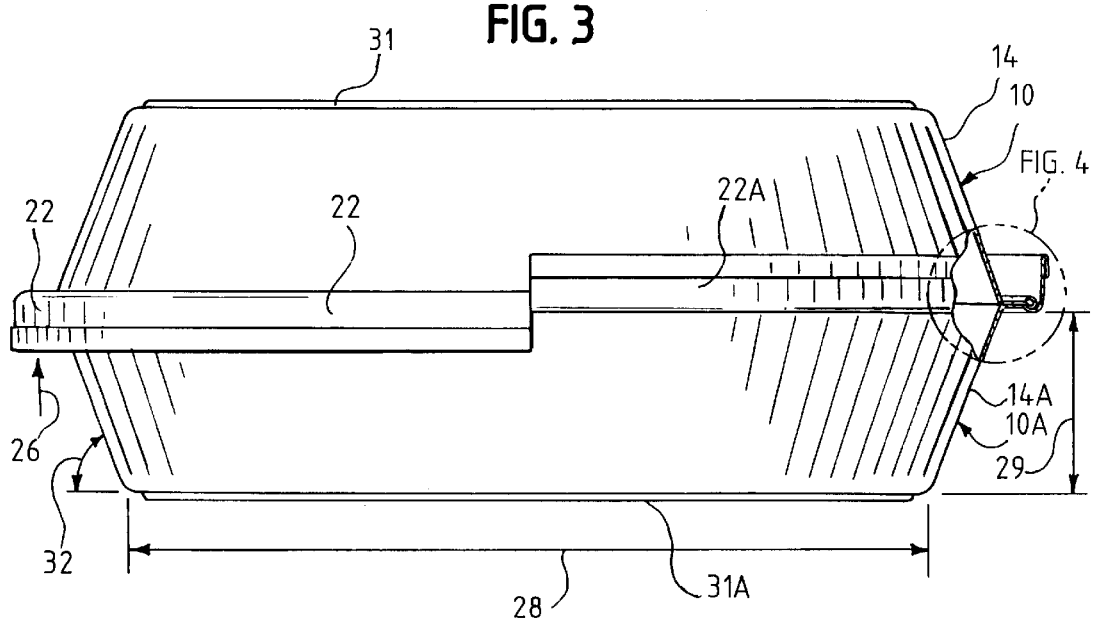
FIG. 3 is a left plan view of a joined pair of the disposable foil pan/covers of FIGS. 1 and 2.

Referring to FIGS. 1–3 there are illustrated interchangeable disposable foil pan/covers 10 and 10A. The roasting pan/covers 10 and 110A are preferably stamped from a single sheet of an inexpensive thin gauge metal such as aluminum foil. In FIG. 1, pan/cover 10 is oriented so as to be used as a cover. In contrast, FIG. 2 shows pan/cover 10A oriented so as to be used as a pan wherein a food product (not shown) may be placed therein.

The disposable foil pan/covers 10 and 10A each have a base wall or panel 12 and 12A with a respective continuous and outwardly extending side wall 14 and 14A about their respective perimeter 13 and 13A. Although pan/cover 10 and 10A and their respective base panels 12 and 12A are shown to be generally circular in FIGS. 1 and 2, it is to be understood that other shapes, such as an oval or rectangle (which includes a square), may alternatively be used. Respective rims 16 and 16A surrounds the pan/covers 10 and 10A. The respective rims 16 and 16A extend outwardly from the respective outer edges 17 and 17A of the respective side walls 14 and 14A and extend substantially parallel to their respective base panels 12 and 12A. Each of the rims 16 and 16A is divided into at least two sections. The first section 18 and 18A of each rim preferably extends for 180° or approximately 50% of the circumference of the rim and at the end thereof has respectively a rolled bead 19 and 19A forming a retainer end. The second section 20 and 20A of each rim 16 and 16A preferably extends for the remaining 180° or remaining 50% of the circumference of the rim 16 and 16A.

Figure 4:
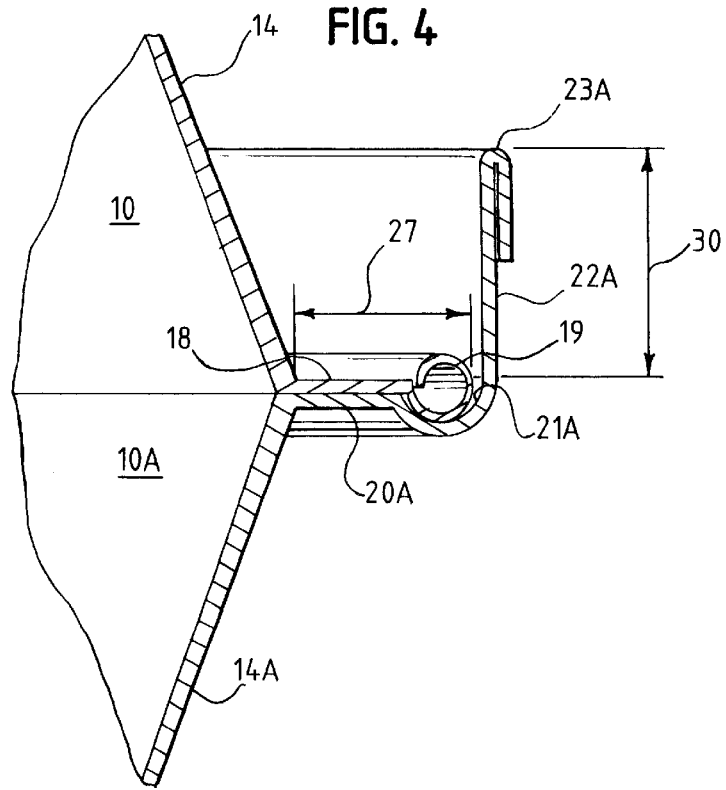
FIG. 4 is a partial cross-sectional view taken along line 4—4 of FIG. 3.

Referring to FIG. 4, the second section of each rim has at the lateral end thereof, a closing indent 21 and 21A. The indents 21 and 21A are sized to accommodate the respective bead 19 and 19A therein as is shown. A respective orientation and closing flange 22 and 22A extends from the end of their respective indent 21 and 21A. The flanges extends substantially perpendicular to their rims 16 and 16A and away from their respective base panel. The ends 23 and 23A of each flange 22 and 22A is formed by being bent over itself to form a smooth rounded sur. The configuration of the pan/covers 10 and 10A allow them to be stacked inside one another for easy storage and display.

Referring to FIGS. 3 and 4, a pair of pan/covers 10 and 10A are in their joined in carrying or cooking position 24. The cover 10 can be easily removed by exerting an upward force 26 on the orientation and closing flange 22.

The width 27 of the rims 16 and 16A is 3/16 to 1/2 inch and preferably between 3/16 to 3/8 inches. The diameter 28 of pan/cover base walls 12 and 12A is generally 5 to 9 inches and when an oval or rectangular, the base wall has a central longitudinal dimension or length of 6 to 20 inches and a transverse dimension or width of 4 to 18 inches. My pan/cover may have the rectangular configuration and/or the flutes and/or contours in the base wall as shown in my U.S. Pat. Nos. 6,293,458 and 5,878,656. The width 29 of the side walls 14 and 14A is preferably 1.0 to 5 inches for my pan/covers and more preferably 1.25 to 2.5 inches. The closing flange length 30 is 3/16 to 1/2 inches and preferably 1/4 to 3/8 inches. The walls 14 and 14A of the pan/covers 10 and 10A incline at an angle 31 equal to 45 to 90° and preferably 60 to 80°.

As shown in FIGS. 1 and 3, each of the base panels 12 and 12A have a central inner recessed portion 32 and a raised perimeter portion 33.

It will become apparent to those skilled in the art that changes and modifications may be made in the foregoing without departing from the spirit of the invention, the scope of which is defined by the appended claims.

I claim:

1. An interchangeable disposable pan/cover having a base wall, a side wall extending from said base wall, a rim surrounding said pan/cover and extending from an outer edge of said side wall, comprising:

said rim extends laterally outwardly away from the side wall and substantially parallel to the base wall, said rim being divided into two substantially equal first rim and second rim sections, said first rim section having a rolled-over bead formed at the outer end thereof, a bead accommodating indent formed at an end of said second rim section, said bead accommodating indent being sized so that when said bead from said first rim section rests therein the lower surface of said first rim section abuts the upper surface of said second rim section, an orientation and closing flange extending upwardly from the outer end of the second rim section and extending substantially perpendicular to the base wall.

2. The interchangeable disposable pan/cover of claim 1 wherein said pan/cover is a pan/cover made from a one-piece aluminum foil.

3. The one-piece interchangeable disposable aluminum foil pan/cover of claim 2 wherein, the side wall is inclined at an angle of 60 to 80 and the width of the side wall is about 1 to 5 inches.

4. The one-piece interchangeable disposable aluminum foil pan/cover of claim 3 wherein, the width of each orientation flange is about 3/16 to 1/2 inches.

5. The one-piece interchangeable disposable aluminum foil pan/cover of claim 4 wherein when a pair of said interchangeable pan/covers are joined, the rims of each pan/cover abut.

6. The one-piece interchangeable disposable aluminum foil pan/cover of claim 5 wherein when a pair of said interchangeable pan/covers are joined, the ends of each pan/cover flange abuts.

* * * * *